US008134471B2

(12) United States Patent
Bristow et al.

(10) Patent No.: US 8,134,471 B2
(45) Date of Patent: Mar. 13, 2012

(54) ALERT PROTOCOL FOR INDICATING A FAILURE CONDITION IN A DISTRIBUTED SYSTEM

(75) Inventors: Basheer Neuhru Bristow, Vail, AZ (US); Jason James Graves, Tucson, AZ (US); Theorium Dantiago Grier, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 12/408,426

(22) Filed: Mar. 20, 2009

(65) Prior Publication Data
US 2010/0238037 A1  Sep. 23, 2010

(51) Int. Cl.
*G08B 21/00* (2006.01)
(52) U.S. Cl. .................. 340/635; 340/691.4; 340/691.6; 702/59; 714/48
(58) Field of Classification Search .................. 340/635, 340/691.6, 691.4, 815.4; 702/59, 58; 714/48
See application file for complete search history.

(56) References Cited

U.S. PATENT DOCUMENTS

| 5,048,017 | A | 9/1991 | Breneman |
| 5,319,359 | A | 6/1994 | Zampini et al. |
| 6,075,445 | A | 6/2000 | McLoughlin et al. |
| 6,626,557 | B1 | 9/2003 | Taylor |
| 6,694,399 | B1 | 2/2004 | Leydier et al. |
| 6,747,563 | B2 * | 6/2004 | Post et al. .................. 340/693.5 |
| 7,023,353 | B2 | 4/2006 | Tewell et al. |
| 2002/0113714 | A1 | 8/2002 | Lopez |
| 2006/0049956 | A1 | 3/2006 | Taylor et al. |
| 2006/0250382 | A1 | 11/2006 | Lee et al. |
| 2007/0260734 | A1 | 11/2007 | Hsu et al. |
| 2008/0036618 | A1 | 2/2008 | Von Gunten |

* cited by examiner

*Primary Examiner* — George Bugg
*Assistant Examiner* — Hongmin Fan
(74) *Attorney, Agent, or Firm* — Nelson and Nelson; Daniel P. Nelson; Alexis V. Nelson

(57) ABSTRACT

A method is disclosed to alert a system administrator of a failure condition within a distributed system having a chassis, a management module, and one or more devices installed in the chassis. Such a method may initially identify whether a device within the chassis has encountered a failure condition. The method may then determine whether the device requires removal from the chassis based on the failure condition. The method may cause a visual fault indicator associated with the device to assume a first illuminated state in the event the device requires removal. The method may cause the visual fault indicator to assume a second illuminated state in the event the device does not require removal. If communication with a management module is possible, a visual fault indicator on the chassis may assume a third illuminated state if the device requires removal. A corresponding apparatus and computer-program product are also disclosed.

20 Claims, 8 Drawing Sheets

Case 5

ALERT PROTOCOL FOR INDICATING A FAILURE CONDITION IN A DISTRIBUTED SYSTEM

BACKGROUND

1. Field of the Invention

This invention relates to distributed systems, and more particularly to apparatus and methods for alerting system administrators of failure conditions within distributed systems.

2. Background of the Invention

In an effort to improve scalability and fault tolerance, increasing numbers of businesses and enterprises are turning to distributed systems to implement their computing infrastructures. As an example, small and medium businesses are turning to modular solutions such as IBM BladeCenters or similar products of IBM's competitors. As distributed systems become more and more prevalent, one need that arises is the ability to service these systems in a consistent fashion.

A distributed system typically contains more than one processing or storage device, and is often capable of running multiple processes or operations simultaneously. Distributed systems may house multiple components within a chassis, such as the IBM BladeCenter-S chassis. Distributed systems are often used to perform complex tasks such as computationally expensive research or managing large web services.

There is currently a need for systems that provide a concise and consistent alert protocol across multiple systems and hardware vendors. In some implementations, a single or small number of LEDs may aggregate many alert conditions. This can be disadvantageous in that the failure alerts generated can be confusing or inadequately describe the failure condition. In addition, certain failure conditions may require removal of a device, whereas other failure conditions may require servicing the device without removal. When a device has failed it may be detrimental to remove the device. For example, it may be detrimental to remove a network device that has encountered a failure and is in the process of performing a shutdown sequence.

This problem may be further complicated in distributed systems where there are many devices, each of which may be configured to generate alerts to the system administrator. For example, many distributed systems have redundancy such as dual disk controllers built into them. A system administrator may undermine the integrity of the system if a failed device is removed that reduces the redundancy in the system.

Current systems often have a set of predefined alerts that may be sent to a system administrator. As hardware is constantly changing, this predefined set of alerts may soon become obsolete, and hardware or software developers may have to choose between a number of predefined alerts that do not accurately describe the error, or may not be sufficient to identify the error at all. In addition, developers may not know all possible error conditions that may occur when a device is first developed, and may wish to be able to represent new error messages when the device's software or firmware is updated.

In some distributed systems, each device (processing unit, storage unit, power unit, etc.) has its own set of LEDs to provide information to the system administrator. These devices may be connected to a management module that also has its own set of LEDs, such as its own fault LED. Each of these devices may be mounted in a chassis, which may also have its own set of LEDs. Whenever a fault is generated by any of the devices mounted in the chassis, a chassis LED may be lit. This may be undesirable because the chassis LED may indicate that an error has occurred even though no hardware needs to be removed, making it difficult for a system administrator to determine which components in a potentially large distributed system have encountered an error condition and need to be replaced.

In view of the foregoing, what are needed are apparatus and methods to provide meaningful alerts and visual indicators (e.g., LEDs) to enable system administrators to identify and handle failure conditions within a distributed system.

BRIEF SUMMARY

The invention has been developed in response to the present state of the art and, in particular, in response to the problems and needs in the art that have not yet been fully solved by currently available apparatus and methods. Accordingly, the invention has been developed to provide apparatus and methods for alerting a system administrator of failure conditions within a distributed system. The features and advantages of the invention will become more fully apparent from the following description and appended claims, or may be learned by practice of the invention as set forth hereinafter.

Consistent with the foregoing, a method is disclosed to alert a system administrator of a failure condition within a distributed system having a chassis, a management module, and one or more devices installed in the chassis. Such a method may include initially identifying whether a device within the chassis has encountered a failure condition. The method may then determine whether the device requires removal from the chassis based on the failure condition. The method may cause a visual fault indicator associated with the device to assume a first illuminated state in the event the device requires removal. The method may cause the visual fault indicator associated with the device to assume a second illuminated state, different from the first illuminated state, in the event the device does not require removal. If communication exists between the device and the management module, a visual fault indicator associated with the chassis may be caused to assume a third illuminated state in the event the device requires removal.

A corresponding apparatus and computer-program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
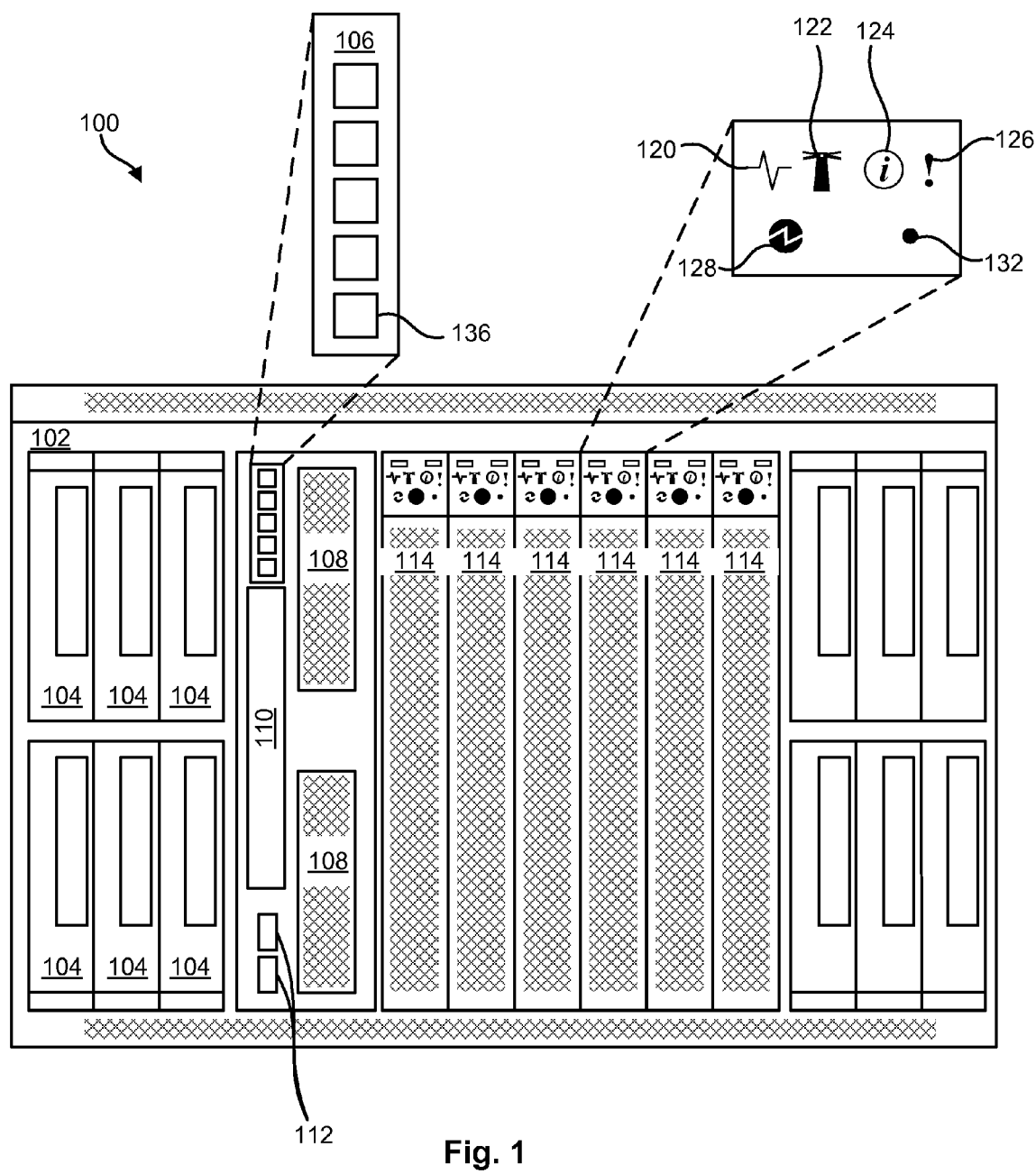
FIG. 1 is a front view of one embodiment of a distributed system in accordance with the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, the present invention may take the form of a computer program product embodied in any tangible medium of expression having computer-usable program code stored in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages.

The present invention is described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
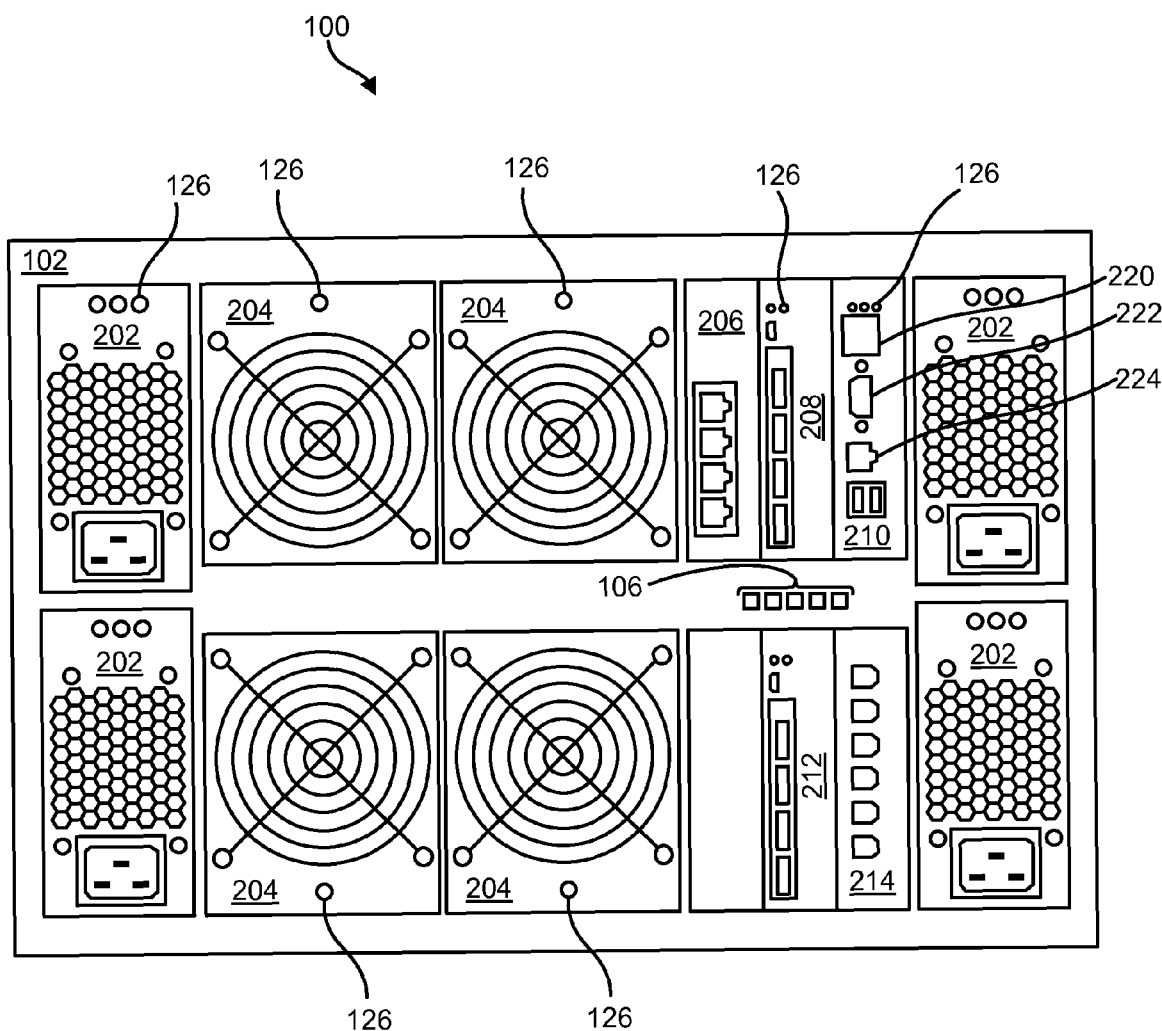
FIG. 2 is a rear view of the distributed system of FIG. 1.

Referring to FIG. 1, one embodiment of a distributed system 100 for implementing an apparatus and method in accordance with the invention is shown. FIG. 1 shows a front view of the distributed system 100 and FIG. 2 shows a rear view of the distributed system 100. The illustrated distributed system 100 is roughly equivalent to a distributed system 100 installed in IBM's BladeCenter-S chassis, although the apparatus and methods disclosed herein are not limited to this configuration. Indeed, the apparatus and methods disclosed herein are applicable to distributed systems 100 using IBM components or analogous systems or components marketed by other manufacturers. Thus, the illustrated configuration is presented only by way of example and is not intended to be limiting.

In selected embodiments, a distributed system 100 (or apparatus 100), and more particularly a distributed system 100 implemented using IBM's BladeCenter-S chassis, may include the following: a chassis 102, one or more storage devices 104 (e.g., disk drives), one or more chassis visual indicators 106, one or more battery backup units 108, an optical disk drive 110, one or more digital interfaces 112, and one or more processing units 114 (e.g., blade servers).

In certain embodiments, redundancy may be built into the distributed system 100 so that it can remain operational in the event one or more components fail. For example, the storage devices 104 may be provided in a RAID configuration to increase speed, preserve data integrity, or the like. Data stored in the storage devices 104 may be accessed by one or more of the processing units 114.

The processing units 114 may be blade servers or other components with processing capabilities, and may contain one or more processors, local high speed memory such as RAM, and local storage which may contain software such as an operating system or other control software. The chassis visual indicators 106 may include a fault indicator 136, which may indicate whether a device installed in the chassis 102 has encountered a fault condition and/or needs to be removed.

In certain embodiments, the processing units 114 may include one or more visual indicators 120, 122, 124, 126, 128, 132 which may display information about the current state of the processing unit 114. In selected embodiments the visual indicators 120, 122, 124, 126, 128, 132 may be LEDs or other indicators capable of displaying a visual signal. In certain embodiments, the processing units 114 may include an "info" indicator 124 and a fault indicator 126. The "info" indicator 124 and/or fault indicator 126 may be activated (e.g., lit) when an error has occurred on the processing unit 114.

Referring to FIG. 2, in certain embodiments, a chassis 102 may also contain one or more power supplies 202, one or more fan modules 204, an Ethernet module 206, an SAS connectivity module 208, a management module 210, a hot swap 10 module 212, a serial pass-through module 214, one or more chassis visual indicators 106 (which may display the same data as the chassis visual indicators 106 illustrated in FIG. 1), and the like. Each of these components may include a fault indicator 126 and/or "info" indicator 124, as previously discussed. For example, the power supplies 202 may include a fault indicator 126 to indicate that the power supplies 202 have encountered an error condition and/or need to be removed. Similarly, the fan modules 204 may include a fault indicator 126 indicating that the fan modules 204 have encountered an error condition and/or need to be removed. Likewise, the SAS connectivity module 208 and management module 210 may also include fault indicators 126.

The management module 210 may be responsible for ensuring correct operation of other components in the chassis 102. In certain embodiments, the management module 210 may query other devices in the system 100 for information regarding their state, and activate the chassis fault indicator 136 in the event one or more components in the chassis 102 have encountered an error and/or need to be removed. In certain embodiments, the management module 210 may also notify a system administrator (by way of an email or other electronic communication) of an error condition so that the administrator can take corrective action.

In certain embodiments, a serial console 220 may allow the management module 210 to communicate with external devices via a serial interface. A video output 222 may allow a system administrator to view the state of some or all of the components in the distributed system 100 via a computer monitor, which may be advantageous as more information can be displayed to the system administrator via a computer screen than can be displayed with simpler visual indicators such as LEDs. A network port 224 may enable communication with the management module 210 over a network, or may allow the management module 210 to transmit error messages and other status reports to a system administrator or another machine. In certain embodiments, the network port 224 may allow the system administrator to configure the distributed system 100 remotely by way of a web interface.

Figure 3:
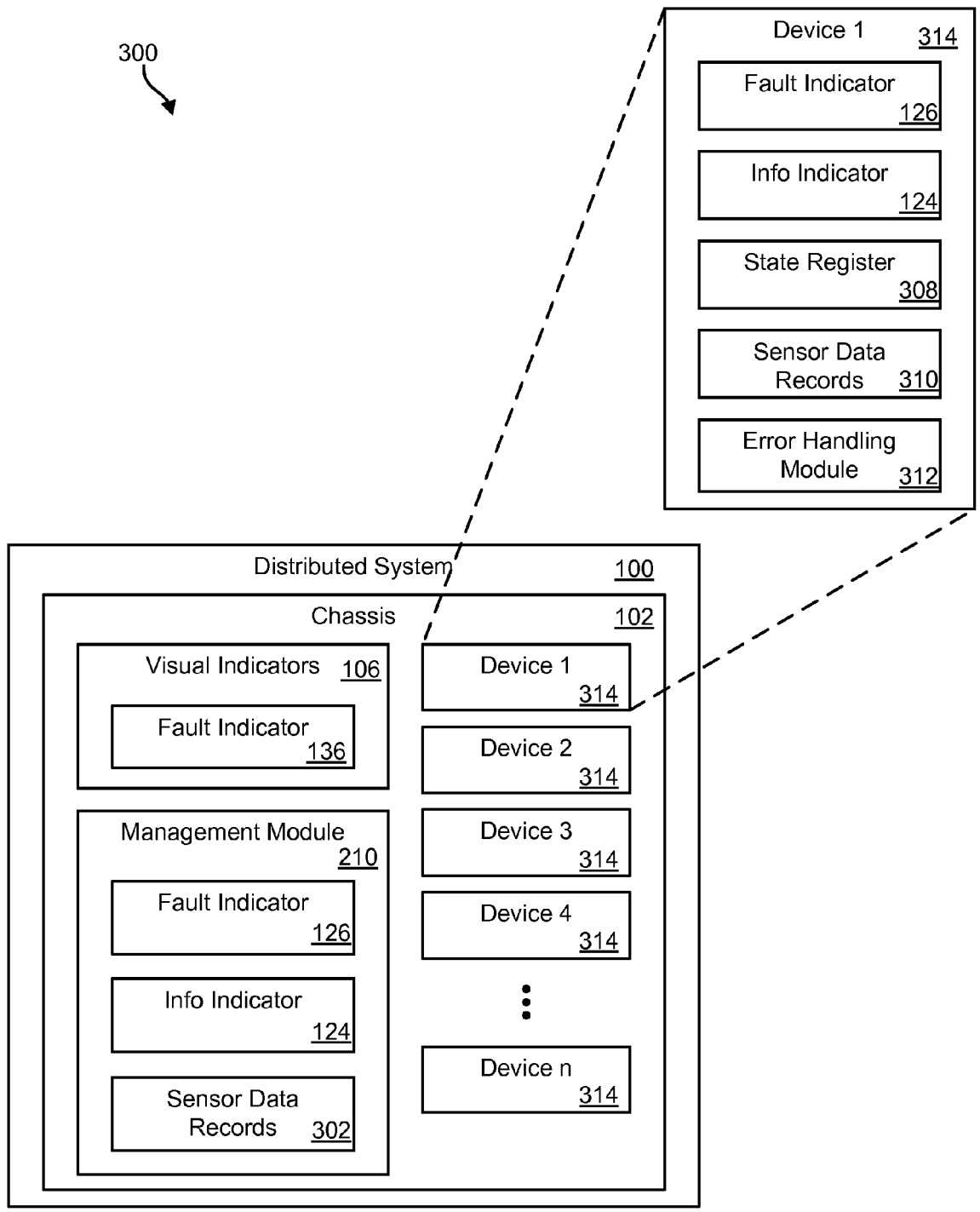
FIG. 3 is a high-level block diagram of one embodiment of a distributed system.

Referring to FIG. 3, in general, a distributed system 100 may include a chassis 102, a management module 210, and one or more devices 314. For the purposes of this description, the term "device" 314 is used to refer to a component having a fault indicator and/or an "info" indicator. For example, a "device" may include a storage device 104, processing unit 114, power supply 202, fan module 204, Ethernet module 206, SAS connectivity module 208, management module 210, hot swap 10 module 212, or serial pass through module 214 as described herein.

The chassis 102 may have a fault indicator 136 in addition to other visual indicators 106. The management module 210 may have a fault indicator 126 and an "info" indicator 124, among other visual indicators. The management module 210 may also store one or more sensor data records 302, which may be acquired from devices 314 in the distributed system 100. This process will be described in more detail in association with FIGS. 5 and 6.

In selected embodiments, each device 314 may include a fault indicator 126 and/or an "info" indicator 124. Each device 314 may also optionally include a state register 308, sensor data records 310, and an error handling module 312. When a device 314 encounters an error, the device 314 may store an error code in the state register 308. The management module 210 may periodically poll the state register 308 to read any error code contained therein. In the event the state register 308 contains an error code, the management module 210 may read the error code and find a matching sensor data record 302 in the management module 210 describing the error condition. This sensor data record 302 may, in certain embodiments, contain a textual description of the error. This textual description may be sent (by email or other means) to a system administrator so that corrective action may be taken.

As shown, each device 314 may store sensor data records 310 which may be sent or downloaded to the management module 210 when the device 314 is installed in the chassis 102. The sensor data records 310 may describe error conditions that are specific to the device 314. One benefit of the sensor data records 310 is that they may be unique for every device 314 and the management module 210 may be able to discover error conditions that may occur for each device 314. When a new device 314 is installed in the chassis 102, the management module 210 may learn about error conditions that can occur in the device 314 by simply downloading the sensor data records 310. This allows a customized set of error conditions to be defined for each device 314. This process will be described in more detail in association with FIGS. 5 and 6.

In certain embodiments, an error handling module 312 may enable a device 314 to process an error in a way that bypasses the management module 210. For example, a device 314 may handle an error internally without notifying the management module 210. The device 314 may also have functionality to notify a system administrator (by email or other electronic communication) of an error condition in a way that bypasses the management module 210 completely. This may occur, for example, where the device 314 is directly connected to a network.

Figure 4:
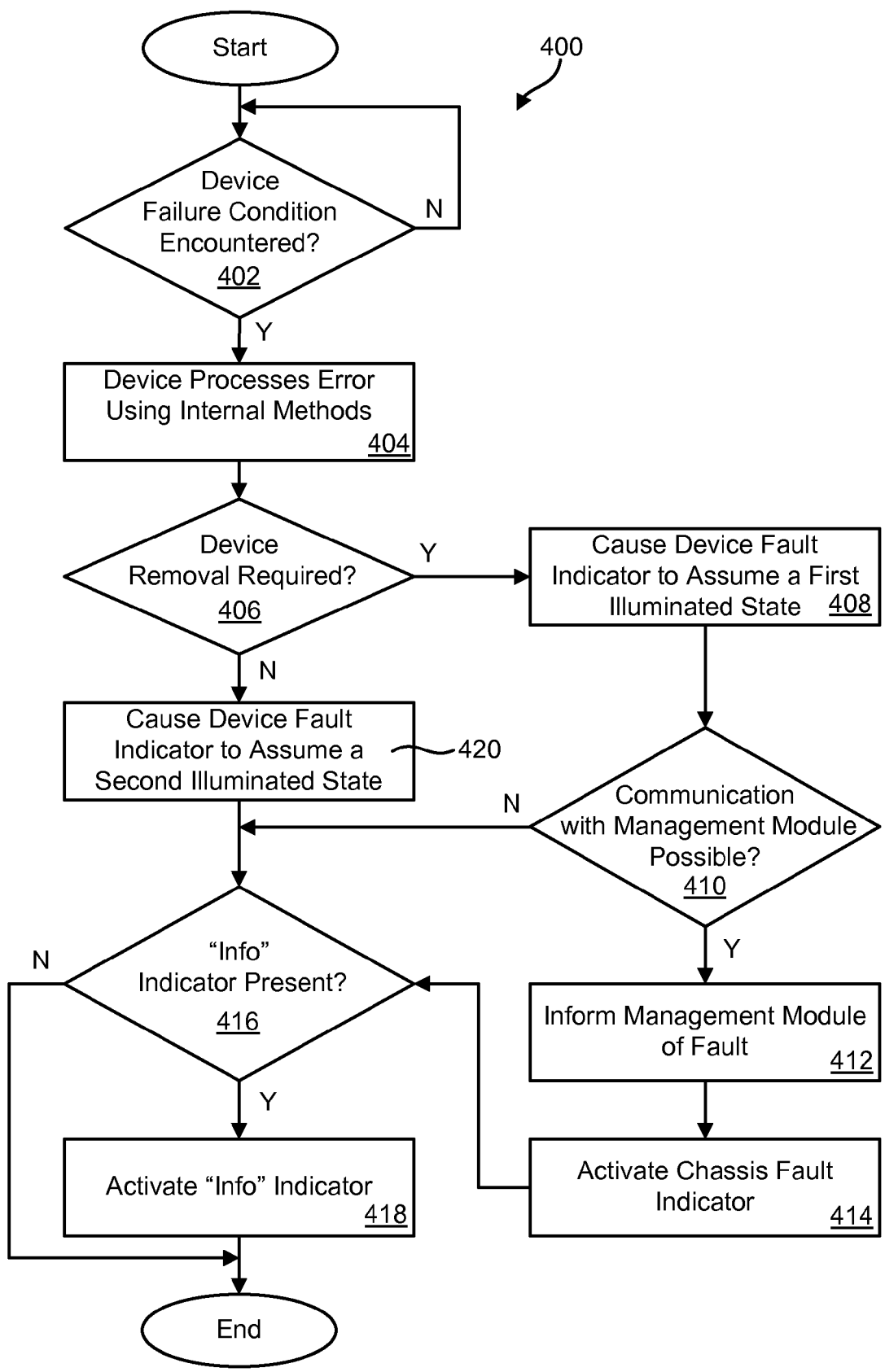
FIG. 4 is a flow chart of one embodiment of a method for illuminating visual indicators in a distributed system in response to a failure condition.

Referring to FIG. 4, a flow chart showing one embodiment of a method 400 (or alert protocol 400) for illuminating visual indicators in response to a failure condition is illustrated. As shown, a device 314 may initially determine 402 whether it has encountered an error condition. If an error has occurred, the device 314 may process 404 the error using internal methods. The device 314 may then determine 406 whether the error condition requires removal of the device 314. This may include, for example, checking the state of the device 314 to ensure that it is not performing shutdown operations that would make removal of the device 314 harmful.

If the device 314 determines 406 that the device 314 requires removal, the device 314 may cause 408 the device's fault indicator 126 to assume a first illuminated state. For example, in selected embodiments, the first illuminated state may be a blinking state (where the fault indicator 126 blinks on and off). On the other hand, if the device 314 determines 406 that the error does not require removal (or should not include removal), the device 314 may cause 420 the device's fault indicator 126 to assume a second illuminated state, different from the first illuminated state. For example, the second illuminated state may be a continuously lit (non-blinking) state.

If the device requires removal, the method 400 may determine 410 whether communication with the management module 210 is possible. If communication with the management module 210 is possible, the device 314 may inform 412 the management module 210 of the fault using any suitable method of communication. In selected embodiments, informing 412 the management module 210 of the fault may include writing an error code to the state register 308 of the device 314. The management module 210 may then periodically poll the state register 308 to determine whether the device 314 has encountered an error. In other embodiments, the device 314 may send a message to the management module 210 indicating that a fault or error has occurred in the device 314.

Upon being notified that a failure has occurred, the management module 210 may activate 414 the chassis fault indicator 136. For example, activating 414 the chassis fault indicator 136 may include setting the chassis fault indicator 136 to a continuously lit illuminated state. Thus, where a device 314 has encountered an error and requires removal, the fault indicator 126 on the device 314 will be blinking and the fault indicator 136 on the chassis 102 will be continuously lit (not blinking). Upon observing that the fault indicator 136 on the chassis 102 is continuously lit, the system administrator will immediately know that there is a device 314 in the chassis 102 that requires removal, and will further know which device 314 requires removal by looking for the device 314 with the blinking fault indicator 126.

On the other hand, where a device 314 has encountered an error but does not require removal (or should not be removed), the fault indicator 126 on the device will be continuously lit and the fault indicator 136 on the chassis 102 will remain dark (i.e., remain unilluminated). Upon observing this condition, the system administrator will immediately know that the device 314 with the continuously lit fault indicator has encountered an error condition but does not require removal or should not be removed.

The method 400 may, in certain embodiments, also determine 416 whether the device 314 that has encountered the failure condition has a visual "info" indicator. If the device 314 has a visual "info" indicator 124, the method 400 may include activating 418 the "info" indicator 124. For example, activating the "info" indicator 124 may include setting the "info" indicator 124 to a continuously lit state. If the device 314 does not have an "info" indicator 124, the method 400 may end without attempting to activate it.

Figure 5:
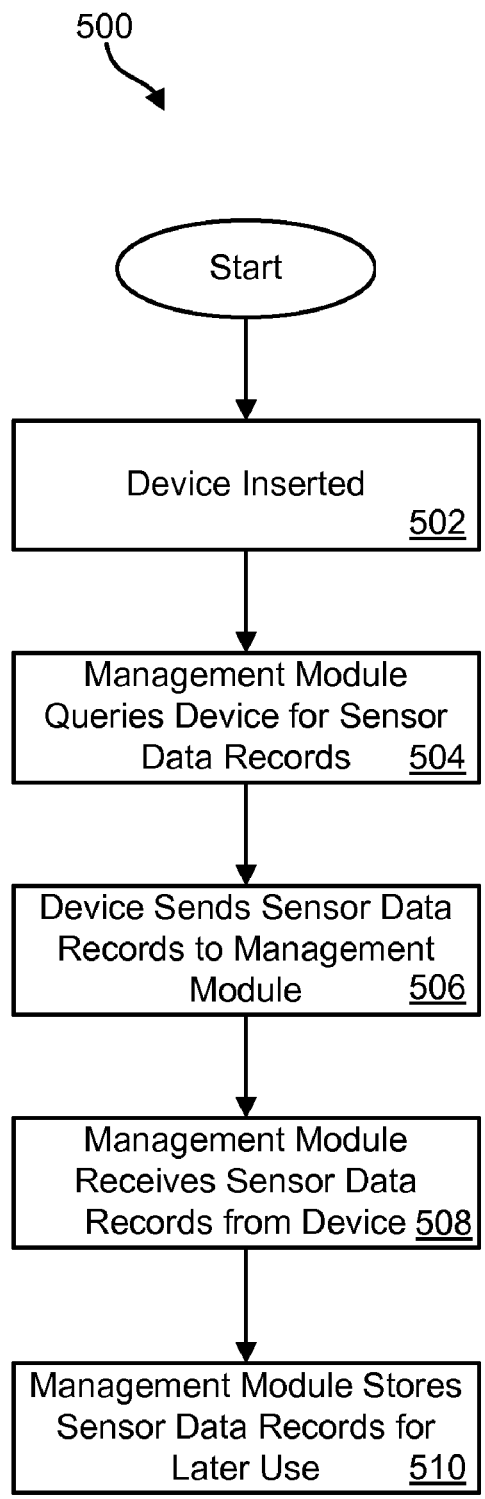
FIG. 5 is a flow chart of one embodiment of a method for enabling alerting in the distributed system.

FIG. 5 shows one embodiment of a method 500 for improving the alert protocol in the distributed system 100. When a device 314 is inserted 502 (or physically or logically installed) in the distributed system 100, the management module 210 may query 504 the device 314 for sensor data records 310 stored thereon. As previously mentioned, a sensor data record 310 may be stored for each error condition that can potentially occur within the device 314. Querying 504 may include sending 504, by the management module 210, a request for information to the device 314. The device 314 may then send 506 any sensor data records 310 that it stores to the management module 210. The management module 210 may receive 508 and store 510 the sensor data records 310 for later use.

Figure 6:
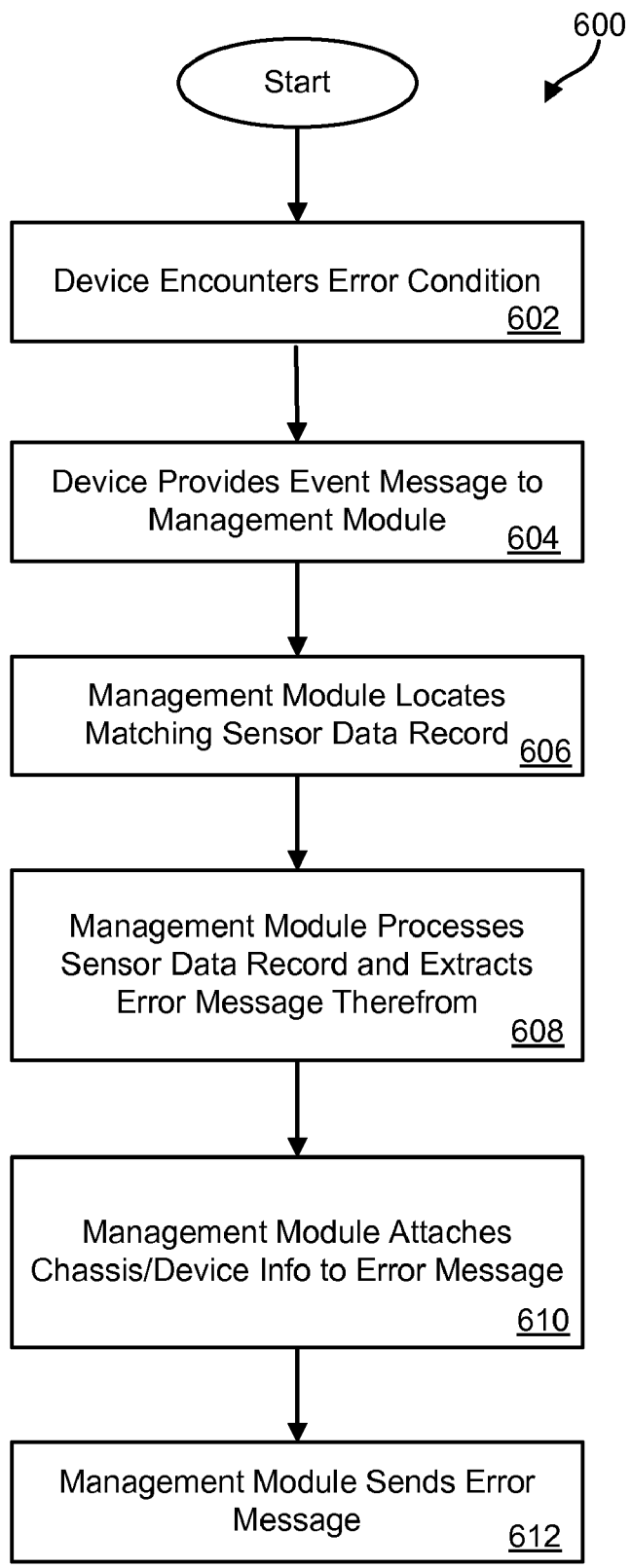
FIG. 6 is a flow chart of one embodiment of a method for handling alerts after the alerting of FIG. 5 has been enabled.

FIG. 6 shows one embodiment of a method 600 for handling alerts after the alerting has been enabled using the method of FIG. 5. As shown, a method 600 may include a device 314 encountering 602 an error condition. Encountering 602 an error condition may include, for example, detecting a hardware or software failure. In certain embodiments, an error code corresponding to the error condition may be stored in a state register 308 of the device 314, as previously described.

The device 314 may then send 604 an event message to the management module 210 to provide notification of the error. In certain embodiments, sending 604 an event message may include reading, by the management module 210, the error code in the state register 308. The management module 210 may then locate 606 the sensor data record 302 corresponding to the event message or error code. Locating 606 may include comparing one or more parts of the event message to one or more parts of the sensor data records 302. In certain embodiments, if a suitable match cannot be found, the management module 210 may take some default error-handling action.

If a match is found, the management module 210 may process 608 the sensor data record 302, which may include extracting 608 any error message stored in the sensor data record 302. In certain embodiments, the management module 210 may attach 610 a chassis serial number or device machine-type model number and serial number (if the device has one) to the error message to provide additional information about the error condition and where it occurred. The management module 210 may then send 612 the error message to an administrator's computer (in the form of an email or other message) or to a device or individual that can address the error condition and take any necessary corrective action.

Referring to FIGS. 7A through 7E, as previously mentioned, the visual indicators on the chassis 102 and devices 314 may assume various illuminated (or unilluminated) states to provide information to an administrator about an error condition. By looking at these visual indicators, an administrator may immediately know that an error condition has occurred and know what type of corrective action to take. FIGS. 7A through 7E show various cases that may occur using the method of FIG. 4. Each of these cases show a chassis 102 and two devices 314a, 314b installed in the chassis 102. One of the devices 314a includes both a fault indicator 126 and an "info" indicator 124. The other device 314b only includes a fault indicator 126.

Figure 7A:
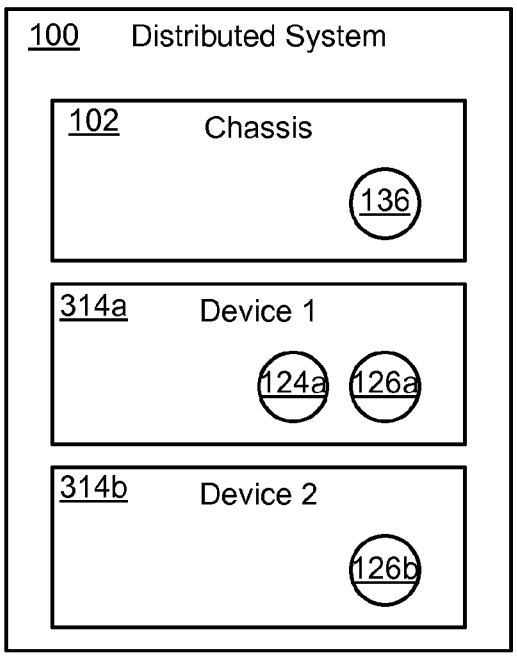
FIGS. 7A through 7E are block diagrams showing various visual indicator states that may occur using the method of FIG. 4.

FIG. 7A shows a first case where there are no errors currently in the system 100. That is, the chassis fault indicator 136, the device fault indicators 126a 126b, and the device "info" indicator 124a are all unilluminated.

Figure 7B:
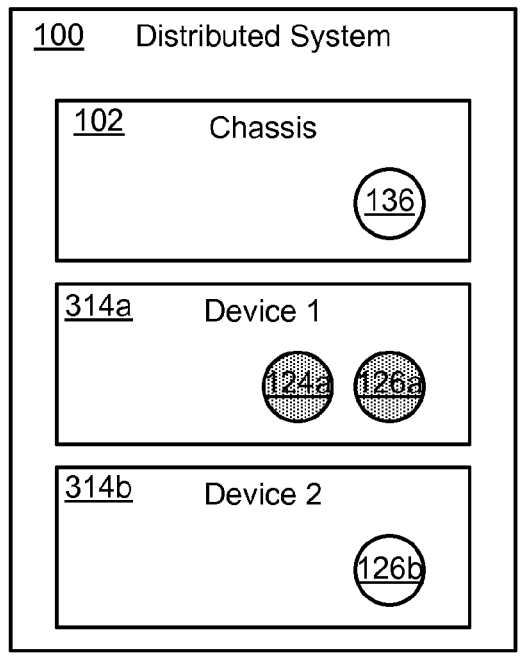

FIG. 7B shows a second case where an error has occurred in the device 314a that does not require removal of the device 314a. In this example, both the fault indicator 126a and the "info" indicator 124a assume a continuously lit illuminated state. The chassis fault indicator 136, on the other hand, remains unilluminated.

Figure 7C:
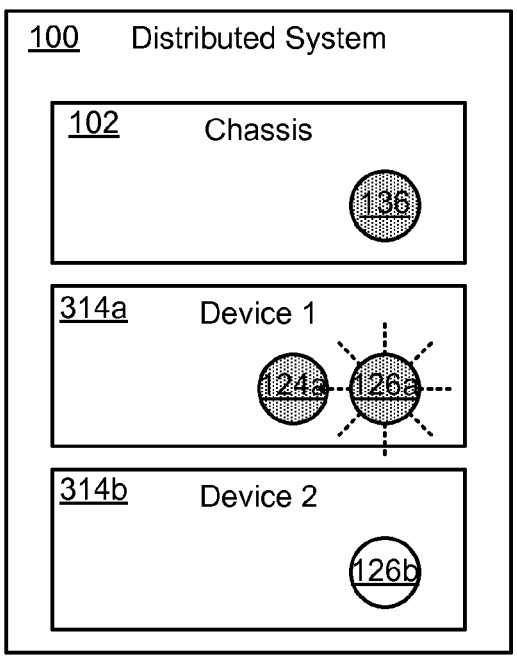

FIG. 7C shows a third case where an error has occurred in the device 314a that requires removal of the device 314a. In this example, the fault indicator 126a assumes a blinking illuminated state. The info indicator 124a, on the other hand, assumes a continuously lit illuminated state. The chassis fault indicator 136 assumes an illuminated state, thereby notifying an administrator that at least one device 314 in the chassis 102 requires removal.

Figure 7D:
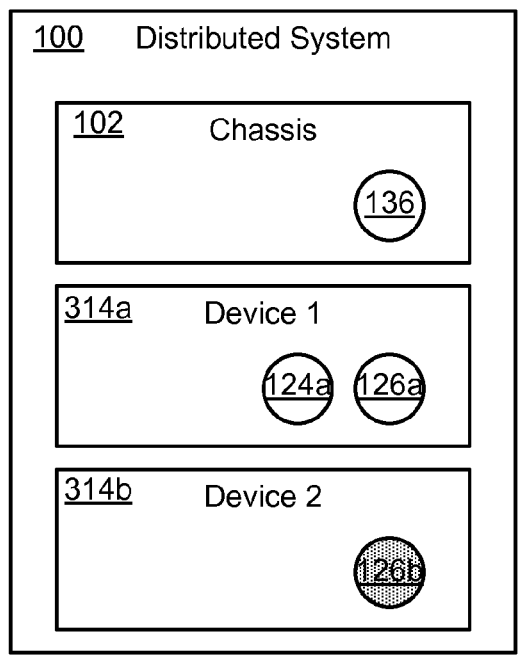

FIG. 7D shows a fourth case where an error has occurred in the device 314b that does not require removal of the device 314b. In this example, the fault indicator 126b assumes a continuously lit illuminated state. The chassis fault indicator 136, on the other hand, remains unilluminated.

Figure 7E:
Figure 7E:
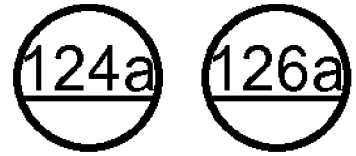
Figure 7E:
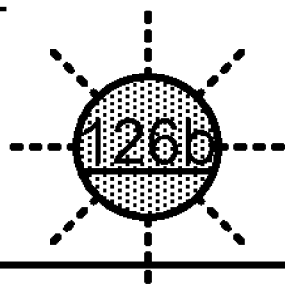

FIG. 7E shows a fifth case where an error has occurred in the device 314b that requires removal of the device 314b. In this example, the fault indicator 126b assumes a blinking illuminated state. The chassis fault indicator 136 assumes a continuously lit illuminated state.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for alerting a system administrator of a failure condition within a distributed system comprising a chassis, a management module, and at least one device installed in the chassis, the method comprising:

identifying whether a device within the chassis has encountered a failure condition;

determining whether the device requires removal from the chassis based on the failure condition;

causing a first visual fault indicator associated with the device to assume a first illuminated state in the event the device requires removal;

causing the first visual fault indicator associated with the device to assume a second illuminated state, different from the first illuminated state, in the event the device does not require removal;

causing, if communication exists between the device and the management module, a second visual fault indicator associated with the chassis to assume a third illuminated state in the event the device requires removal; and causing the second visual fault indicator associated with the chassis to remain unilluminated if the device does not require removal based on the failure condition.

2. The method of claim 1, wherein the first illuminated state is a blinking state.

3. The method of claim 1, wherein the second illuminated state is a continuously lit state.

4. The method of claim 1, wherein the third illuminated state is a continuously lit state.

5. The method of claim 1, wherein the first and second visual fault indicators associated with the device and chassis are LEDs.

6. The method of claim 1, further comprising a first visual "info" indicator associated with the device to assume a fourth illuminated state in the event the device has encountered a failure condition.

7. The method of claim 1, wherein the fourth illuminated state is a continuously lit state.

8. The method of claim 1, further comprising causing, if communication exists between the device and the management module, a second visual "info" indicator associated with the chassis to assume a fifth illuminated state in the event the device has encountered a failure condition.

9. The method of claim 8, wherein the fifth illuminated state is a continuously lit state.

10. The method of claim 1, wherein the device is one of a server module, a storage module, a switch module, a power supply module, and a communications module.

11. An apparatus for alerting a system administrator of a failure condition within a distributed system comprising a chassis, a management module, and at least one device installed in the chassis, the apparatus comprising:

a device within the chassis for which a failure condition can be identified;

the device further configured to determine whether the device requires removal from the chassis based on the failure condition;

a first visual fault indicator associated with the device and configured to assume a first illuminated state in the event the device requires removal;

the first visual fault indicator associated with the device further configured to assume a second illuminated state, different from the first illuminated state, in the event the device does not require removal; and a second visual fault indicator associated with the chassis configured to assume a third illuminated state in the event the device requires removal and communication exists between the device and the management module.

12. The apparatus of claim 11, wherein the first illuminated state is a blinking state.

13. The apparatus of claim 11, wherein the second illuminated state is a continuously lit state.

14. The apparatus of claim 11, wherein the third illuminated state is a continuously lit state.

15. The apparatus of claim 11, wherein the first and second visual fault indicators associated with the device and chassis are LEDs.

16. A computer-program product for alerting a system administrator of a failure condition within a distributed system comprising a chassis, a management module, and at least one device installed in the chassis, the computer-program product comprising a non-transitory computer-readable storage medium having computer-readable program code stored therein, the computer-readable program code comprising:

computer-readable code to identify whether a device within the chassis has encountered a failure condition;

computer-readable code to determine whether the device requires removal from the chassis based on the failure condition;

computer-readable code to cause a first visual fault indicator associated with the device to assume a first illuminated state in the event the device requires removal;

computer-readable code to cause the first visual fault indicator associated with the device to assume a second illuminated state, different from the first illuminated state, in the event the device does not require removal; and computer-readable code to cause, if communication exists between the device and the management module, a second visual fault indicator associated with the chassis to assume a third illuminated state in the event the device requires removal.

17. The computer-program product of claim 16, wherein the first illuminated state is a blinking state.

18. The computer-program product of claim 16, wherein the second illuminated state is a continuously lit state.

19. The computer-program product of claim 16, wherein the third illuminated state is a continuously lit state.

20. The computer program product of claim 16, wherein the first and second visual fault indicators associated with the device and chassis are LEDs.

* * * * *